United States Patent [19]

Naganuma et al.

[11] Patent Number: 5,391,661
[45] Date of Patent: Feb. 21, 1995

[54] PROCESS FOR PRODUCING A STYRENIC POLYMER AND A CATALYST FOR USE THEREIN

[75] Inventors: Shoji Naganuma; Masami Watanabe, both of Sodegaura; Norio Tomotsu, Ichihara, all of Japan

[73] Assignee: Idemitsu Kosan Co., Ltd., Tokyo, Japan

[21] Appl. No.: 965,290

[22] PCT Filed: Jun. 9, 1992

[86] PCT No.: PCT/JP92/00736

§ 371 Date: Feb. 2, 1993

§ 102(e) Date: Feb. 2, 1993

[87] PCT Pub. No.: WO92/22589

PCT Pub. Date: Dec. 23, 1992

[30] Foreign Application Priority Data

Jun. 12, 1991 [JP] Japan .................. 3-139955

[51] Int. Cl.$^6$ .................. C08F 4/16; C08F 12/08; C08F 4/54
[52] U.S. Cl. .................. 526/133; 526/114; 526/115; 526/126; 526/127; 526/128; 526/132; 526/134; 526/148; 526/151; 526/159; 526/160; 526/161; 526/163; 526/165; 526/166; 526/170; 526/347.2; 502/102; 502/103; 502/152; 502/155; 502/164
[58] Field of Search .................. 526/132, 147, 160, 170, 526/114, 115, 126, 127, 128, 133, 134, 148, 151, 159, 161, 163, 165, 166, 347.2; 502/164, 102, 103, 155, 152

[56] References Cited

U.S. PATENT DOCUMENTS

| | | | |
|---|---|---|---|
| 3,418,303 | 12/1968 | Barney et al. | 526/161 |
| 3,459,825 | 8/1969 | Eberhardt et al. | 526/161 X |
| 4,680,353 | 7/1987 | Ishihara et al. | |
| 5,064,802 | 11/1991 | Stevens et al. | 526/170 X |
| 5,066,740 | 11/1991 | Rhodes | 526/161 X |
| 5,066,741 | 11/1991 | Campbell . | |
| 5,153,157 | 10/1992 | Hlatky et al. | 526/132 X |
| 5,171,919 | 12/1992 | Watanabe et al. | |

FOREIGN PATENT DOCUMENTS

| | | |
|---|---|---|
| 0224097 | 11/1986 | European Pat. Off. . |
| 0275943 | 1/1988 | European Pat. Off. . |
| 0276801 | 1/1988 | European Pat. Off. . |
| 0421659 | 9/1990 | European Pat. Off. . |
| 62-187708 | 8/1987 | Japan . |
| 63-179906 | 7/1988 | Japan . |
| 63-241009 | 10/1988 | Japan . |
| 3-124706 | 5/1991 | Japan . |

*Primary Examiner*—Fred Teskin
*Attorney, Agent, or Firm*—Oblon, Spivak, McClelland, Maier, & Neustadt

[57] ABSTRACT

There are disclosed a catalyst well suited for producing a styrenic polymer having a high degree of syndiotactic configuration which comprises a transition-metal compound such as pentamethylcyclopentadienyltrimethyltitanium and a coordination complex compound comprising an anion in which a plurality of radicals are bonded to a metal and a quaternary ammonium salt, the compound being exemplified by orthocyano-N-methylpyridinium tetra(pentafluorophenyl)borate, or comprises an alkylating agent such as triisobutylaluminum in addition to the above two compounds; and a process for producing a styrenic polymer having a high degree of syndiotactic configuration by polymerizing a styrenic monomer using the aforementioned catalyst. Consequently, a styrenic polymer having a high degree of syndiotactic configuration can be produced effectively without the use of an expensive aluminoxane required in a large amount if used.

9 Claims, No Drawings

PROCESS FOR PRODUCING A STYRENIC POLYMER AND A CATALYST FOR USE THEREIN

TECHNICAL FIELD

The present invention relates to a process for producing a styrenic polymer and a catalyst for use therein. More particularly, it pertains to a process for efficiently producing a styrenic polymer having a high degree of syndiotactic configuration in the stereochemical structure of the polymer main chain and to a catalyst to be used in the process.

BACKGROUND ART

It has recently been disclosed by the research group of the present inventors that a styrenic polymer having a syndiotactic configuration is obtained by polymerizing a styrenic monomer by the use of a catalyst comprising as primary ingredients a transition-metal compound, especially a titanium compound and an alkylaluminoxane (Refer to Japanese Patent Application Laid-Open Nos. 187708/1987, 179906/1988, 241009/1988, etc.).

Methylaluminoxane, particularly suitable as an alkylaluminoxane, is obtained usually by the reaction between trimethylaluminum and water. However, the above-mentioned reaction involves the problem that the reaction is difficult to put into practical production because of its violent reaction, and further suffers the disadvantages that in addition to requiring expensive trimethylaluminum as the starting material, an excessively large amount of methylaluminoxane is required as a component of the catalyst as compared with the amount of a transition-metal, thus causing an extremely expensive catalyst, and further that after the polymerization reaction, an additional step for the removal of the catalyst remaining in the resultant polymer is required.

There has recently been reported that a polymerization catalyst not containing aluminoxane is capable of polymerizing α-olefin(principally, ethylene) by R. Taube (J. Organomet. Chem. C9–C11, 347 (1988)), H. Turner (J. Am. Chem. Soc. 111,2728 (1989)), R. F. Jordan (Organomet. 8,2892 (1989)), etc. Nevertheless, investigation has not yet been made on a polymerization catalyst not containing aluminoxane for the polymerization of a styrenic monomer, leaving the problem that a styrenic monomer, different from an α-olefin, is likely to be polymerized into an atactic polymer in the presence of a cationic species.

Under such circumstances, intensive research and investigation were concentrated by the present inventors into the development of a catalyst capable of efficiently polymerizing a styrenic monomer into the styrenic polymer having syndiotactic configuration without the use of expensive aluminoxane required in a large amount and the development of the process for producing the styrenic polymer by the use of the aforementioned catalyst.

DISCLOSURE OF THE INVENTION

As a result, it has been found by the present inventors that the use of a catalyst combination comprising a specific transition-metal compound and a specific coordination complex compound or a catalyst combination comprising a alkylating agent in addition to the aforesaid two specific compounds is capable of efficiently producing the objective styrenic polymer having syndiotactic configuration by virtue of its markedly improved activity and at the same time, capable of minimizing the residual catalyst in the resultant polymer.

The present invention has been accomplished on the basis of the above-mentioned finding and information.

Specifically, the present invention provides a catalyst which comprises (A) a transition-metal compound and (B) a coordination complex compound comprising an anion in which a plurality of radicals are bonded to a metal and a quaternary ammonium salt. The present invention also provides a catalyst which comprises the above-mentioned components (A) and (B) and an alkylating agent. The present invention further provides a process for producing a styrenic polymer by the use of the aforesaid catalyst in the case of polymerizing at least one styrenic monomer selected from styrene and a derivative thereof.

THE MOST PREFERRED EMBODIMENT TO CARRY OUT THE INVENTION

The catalyst according to the present invention comprises as principal components the above-mentioned components (A) and (B), or the components (A), (B) and (C).

As the transition-metal compound, that is, the component (A) of the catalyst, there are available a variety of compounds, which are usually exemplified by the compounds of Groups 3 to 6 metals of the Periodic Table and lanthanoid compounds. Of these are preferable the compounds of Group 4 metals (titanium, zirconium, hafnium, vanadium, etc.). Various titanium compounds can be used and a preferred example is at least one compound selected from the group consisting of titanium compounds and titanium chelate compounds represented by the general formula (I)

$$TiR^1_a R^2_b R^3_c R^4_{4-(a+b+c)} \qquad (I)$$

or the general formula

$$TiR^1_d R^2_e R^3_{3-(d+e)} \qquad (II)$$

wherein $R^1$, $R^2$, $R^3$ and $R^4$ are each a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group or a halogen atom; a, b and c are each an integer of 0 to 4; and d and e are each an integer of 0 to 3.

$R^1$, $R^2$, $R^3$ and $R^4$ in the general formulae (I) and (II) each represent a hydrogen atom, an alkyl group having 1 to 20 carbon atoms (specifically, methyl group, ethyl group, propyl group, butyl group, amyl group, isoamyl group, isobutyl group, octyl group and 2-ethylhexyl group), an alkoxy group having 1 to 20 carbon atoms (specifically, methoxy group, ethoxy group, propoxy group, butoxy group, amyloxy group, hexyloxy group, and 2-ethylhexyloxy group), an aryl group having 6 to 20 carbon atoms, an alkylaryl group, an arylalkyl group (specifically, phenyl group, tolyl group, xylyl group and benzyl group), an acyloxy group having 1 to 20 carbon atoms (specifically, heptadecylcarbonyloxy group), a cyclopentadienyl group, a substituted cyclopentadienyl group (specifically, methylcyclopentadienyl group, 1,2-dimethylcyclopentadienyl group and pentamethylcyclopentadienyl group), an indenyl group or a halogen atom (specifically, chlorine, bromine, iodine and fluorine). These $R^1$, $R^2$, $R^3$ and $R^4$ may be the same as or different from each other. Furthermore, a, b and c are each an integer of 0 to 4, and d and e are each an integer of 0 to 3.

Other preferred titanium compounds include a titanium compound represented by the formula:

$$TiRXYZ \qquad (III)$$

wherein R represents a cyclopentadienyl group, a substituted cyclopentadienyl group, an indenyl group, a substituted indenyl group or fluorenyl group; X, Y and Z, independently of one another, are each a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom.

The substituted cyclopentadienyl group represented by R in the above formula is, for example, a cyclopentadienyl group substituted by at least one alkyl group having 1 to 6 carbon atoms, more specifically, methylcyclopentadienyl group, 1,3-dimethylcyclopentadienyl group, 1,2,4-trimethylcyclopentadienyl group, 1,2,3,4-tetramethylcyclopentadienyl group, trimethylsilylcyclopentadienyl group, 1,3-di(trimethylsilyl)cyclopentadienyl group, tertbutylcyclopentadienyl group, 1,3-di(-tertbutyl)cyclopentadienyl group and pentamethylcyclopentadienyl group. In addition, X, Y and Z, dependently of one another, are each a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxy group having 1 to 12 carbon atoms (specifically, methoxy group, ethoxy group, propoxy group, butoxy group, amyloxy group, hexyloxy group, octyloxy group and 2-ethylhexyloxy group), an aryl group having 6 to 20 carbon atoms (specifically, phenyl group and naphthyl group), an aryloxy group having 6 to 20 carbon atoms (specifically, phenoxy group), an arylalkyl group having 6 to 20 carbon atoms (specifically, benzyl group) or a halogen atom (specifically, chlorine, bromine, iodine and fluorine).

Specific examples of the titanium compounds represented by the general formula (III) include
cyclopentadienyltrimethyltitanium,
cyclopentadienyltriethyltitanium,
cyclopentadienyltripropyltitanium,
cyclopentadienyltributyltitanium,
methylcyclopentadienyltrimethyltitanium,
1,2-dimethylcyclopentadienyltrimethyltitanium,
1,2,4-trimethylcyclopentadienyltrimethyltitanium,
1,2,3,4-tetramethylcyclopentadienyltrimethyltitanium,
pentamethylcyclopentadienyltrimethyltitanium,
pentamethylcyclopentadienyltriethyltitanium,
pentamethylcyclopentadienyltripropyltitanium,
pentamethylcyclopentadienyltributyltitanium,
cyclopentadienylmethyltitanium dichloride,
cyclopentadienylethyltitanium dichloride,
pentamethylcyclopentadienylmethyltitanium dichloride,
pentamethylcyclopentadienylethyltitanium dichloride,
cyclopentadienyldimethyltitanium monochloride,
cyclopentadienyldiethyltitanium monochloride,
cyclopentadienyltitanium trimethoxide,
cyclopentadienyltitanium triethoxide,
cyclopentadienyltitanium tripropoxide,
cyclopentadienyltitanium triphenoxide,
pentamethylcyclopentadienyltitanium trimethoxide,
pentamethylcyclopentadienyltitanium triethoxide,
pentamethylcyclopentadienyltitanium tripropoxide,
pentamethylcyclopentadienyltitanium tributoxide,
pentamethylcyclopentadienyltitanium triphenoxide,
cyclopentadienyltitanium trichloride,
pentamethylcyclopentadienyltitanium trichloride,
cyclopentadienylmethoxyltitanium dichloride,
cyclopentadienyldimethoxytitanium chloride,
pentamethylcyclopentadienylmethoxytitanium dichloride,
cyclopentadienyltribenzyltitanium,
pentamethylcyclopentadienylmethyldiethoxytitanium,
indenyltitanium trichloride, indenyltitanium trimethoxide,
indenyltitanium triethoxide, indenyltrimethyltitanium and
indenyltribenzyltitanium.

Of these titanium compounds, a compound not containing a halogen atom is preferred and a titanium compound having one $\pi$ electron type ligand as mentioned above is particularly preferred.

Furthermore, a condensed titanium compound represented by the following formula may be used as the titanium compound.

wherein $R^5$ and $R^6$ each represent a halogen atom, an alkoxy group having 1 to 20 carbon atoms or an acyloxy group; and k is an integer of 2 to 20.

Furthermore, the above titanium compounds may be used in the form of a complex formed with an ester, an ether or the like.

Examples of the trivalent titanium compound represented by the formula (IV) typically include a trihalogenated titanium such as titanium trichloride; and a cyclopentadienyltitanium compound such as cyclopentadienyltitanium dichloride, and also those obtained by reducing a tetravalent titanium compound. These trivalent titanium compounds may be used in the form of a complex formed with an ester, an ether or the like.

In addition, examples of the zirconium compound used as the transition-metal compound include tetrabenzylzirconium, zirconium tetraethoxide, zirconium tetrabutoxide, bisindenylzirconium dichloride, triisopropoxyzirconium chloride, zirconium benzyl dichloride and tributoxyzirconium chloride, examples of the hafnium compound include tetrabenzyl hafnium, hafnium tetraethoxide and hafnium tetrabutoxide, and examples of the vanadium compound include vanadyl bisacetylacetonato, vanadyl triacetylacetonato, vanadyl triethoxide and vanadyl tripropoxide. Of the transition-metal compounds, the titanium compounds are particularly desirable.

As the transition-metal compound which constitutes the component (A) of the catalyst, there is used a transition-metal compound with two ligands having conjugated $\pi$ electrons, for example, at least one compound selected from the group consisting of the transition-metal compound represented by the general formula:

$$M^1R^7R^8R^9R^{10} \qquad (V)$$

wherein $M^1$ is titanium, zirconium or hafnium; $R^7$ and $R^8$ are each a cyclopentadienyl group, substituted cyclopentadienyl group, indenyl group or fluorenyl group; and $R^9$ and $R^{10}$ are each a hydrogen atom, halogen, hydrocarbon radical having 1 to 20 carbon atoms, alkoxy group having 1 to 20 carbon atoms, amino group or thioalkoxy group having 1 to 20 carbon atoms, but $R^7$ and $R^8$ may be each cross-linked by a hydrocarbon radical having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of $R^7$ and $R^8$ in the general formula (V) designates a cyclopentadienyl group, substituted cyclopentadienyl group, more specifically, methylcyclopentadienyl group;
1,3-dimethylcyclopentadienyl group;
1,2,4-trimethylcyclopentadienyl group;
1,2,3,4-tetramethylcyclopentadienyl group;
pentamethylcyclopentadienyl group;
trimethylsilylcyclopentadienyl group;
1,3-di(trimethylsilyl)cyclopentadienyl group;
1,2,4-tri(trimethylsilyl)cyclopentadienyl group;
tert-butylcyclopentadienyl group;
1,3-di(tert-butyl)cyclopentadienyl group;
1,2,4-tri(tert-butyl)cyclopentadienyl group or the like, indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and cross-linked by an alkylidene group having 1 to 5 carbon atoms, more specifically, methylidyne group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like. Each of $R^9$ and $R^{10}$, independently of one another, indicates, as described above but more specifically, a hydrogen atom; an alkyl group having 1 to 20 carbon atoms such as methyl group, ethyl group, propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxy group, hexyloxy group, octyloxy group or 2-ethylhexyloxy group; an aryloxy group having 6 to 20 carbon atoms such as phenoxy group; an amino group; or a thioalkoxyl group having 1 to 20 carbon atoms.

Specific examples of the transition-metal compounds represented by the general formula (V) include
bis(cyclopentadienyl)dimethyltitanium;
bis(cyclopentadienyl) diethyltitanium;
bis(cyclopentadienyl)dipropyltitanium;
bis(cyclopentadienyl)dibutyltitanium:
bis(methylcyclopentadienyl)dimethyltitanium;
bis(tertbutylcyclopentadienyl)dimethyltitanium;
bis(1,3-dimethylcyclopentadienyl)dimethyltitanium;
bis(1,3-di-tertbutylcyclopentadienyl)dimethyltitanium;
bis(1,2,4-trimethylcyclopentadienyl)dimethyltitanium;
bis(1,2,3,4-tetramethylcyclopentadienyl)dimethyltitanium;
bis(cyclopentadienyl)dimethyltitanium;
bis(trimethylsilylcyclopentadienyl)dimethyltitanium;
bis(1,3-di(trimethylsilyl)cyclopentadienyl)dimethyltitanium;
bis[1,2,4-tri(trimethylsilyl)cyclopentadienyl]dimethyltitanium;
bis(indenyl)dimethyltitanium;
bis(fluorenyl)dimethyltitanium;
methylenebis(cyclopentadienyl)dimethyltitanium;
ethylidenebis(cyclopentadienyl)dimethyltitanium;
methylenebis(2,3,4,5-tetramethylcyclopentadienyl)dimethyltitanium;
ethylidenebis(2,3,4,5-tetramethylcyclopentadienyl)dimethyltitanium;
dimethylsilylbis(2,3,4,5-tetramethylcyclopentadienyl)dimethyltitanium;
methylenebisindenyldimethyltitanium;
ethylidenebisindenyldimethyltitanium;
dimethylsilylbisindenyldimethyltitanium;
methylenebisfluorenyldimethyltitanium;
ethylidenbisfluorenyldimethyltitanium;
dimethylsilylbisfluorenyldimethyltitanium; methylene(tertbutylcyclopentadienyl)(cyclopentadienyl)dimethyltitanium;
methylene(cyclopentadienyl)(indenyl)dimethyltitanium;
ethylidene(cyclopentadienyl)(indenyl)dimethyltitanium;
dimethylsilyl(cyclopentadienyl)(indenyl)dimethyltitanium;
methylene(cyclopentadienyl)(fluorenyl)dimethyltitanium;
ethylidene(cyclopentadienyl)(fluorenyl)dimethyltitanium;
dimethylsilyl(cyclopentadienyl)(fluorenyl)dimethyltitanium;
methylene(indenyl)(fluorenyl)dimethyltitanium;
ethylidene(indenyl)(fluorenyl)dimethyltitanium;
dimethylsilyl(indenyl)(fluorenyl)dimethyltitanium;
bis(cyclopentadienyl)dibenzyltitanium;
bis(tertbutylcyclopentadienyl)dibenzyltitanium;
bis(methylcyclopentadienyl)dibenzyltitanium;
bis(1,3-dimethylcyclopentadienyl)dibenzyltitanium;
bis(1,2,4-trimethylcyclopentadienyl)dibenzyltitanium;
bis(1,2,3,4-tetramethylcyclopentadienyl)dibenzyltitanium;
bis(pentamethylcyclopentadienyl)dibenzyltitanium;
bis(trimethylsilylcyclopentadienyl)dibenzyltitanium;
bis[1,3-di-(trimethylsilyl)cyclopentadienyl]dibenzyltitanium;
bis[1,2,4-tri(trimethylsilyl)cyclopentadienyl]dibenzyltitanium;
bis(indenyl)dibenzyltitanium;
bis(fluorenyl)dibenzyltitanium;
methylenebis(cyclopentadienyl)dibenzyltitanium;
ethylidenebis(cyclopentadienyl)dibenzyltitanium;
methylenebis(2,3,4,5-tetramethylcyclopentadienyl)dibenzyltitanium;
ethylidenebis(2,3,4,5-tetramethylcyclopentadienyl)dibenzyltitanium;
dimethylsilylbis(2,3,4,5-tetramethylcyclopentadienyl)dibenzyltitanium;
methylenebis(indenyl)dibenzyltitanium;
ethylidenebis(indenyl)dibenzyltitanium;
dimethylsilylbis(indenyl)dibenzyltitanium;
methylenebis(fluorenyl)dibenzyltitanium;

ethylidenebis(fluorenyl)dibenzyltitanium;
dimethylsilylbis(fluorenyl)dibenzyltitanium;
methylene(cyclopentadienyl)(indenyl)benzyltitanium;
ethylidene(cyclopentadienyl)(indenyl)benzyltitanium;
dimethylsilyl(cyclopentadienyl)(indenyl)dibenzyltitanium;
methylene(cyclopentadienyl)(fluorenyl)dibenzyltitanium;
ethylidene(cyclopentadienyl)(fluorenyl)dibenzyltitanium;
dimethylsilyl(cyclopentadienyl)(fluorenyl)dibenzyltitanium;
methylene(indenyl)(fluorenyl)dibenzyltitanium;
ethylidene(indenyl)(fluorenyl)dibenzyltitanium;
dimethylsilyl(indenyl)(fluorenyl)dibenzyltitanium;
biscyclopentadienyltitanium dimethoxide;
biscyclopentadienyltitanium diethoxide;
biscyclopentadienyltitanium dipropoxide;
biscyclopentadienyltitanium dibutoxide;
biscyclopentadienyltitanium dipheoxide;
bis(methylcyclopentadienyl)titanium dimethoxide;
bis(1,3-dimethylcyclopentadienyl)titanium dimethoxide;
bis(1,2,4-trimethylcyclopentadienyl)titanium dimethoxide;
bis(1,2,3,4-tetramethylcyclopentadienyl)titanium dimethoxide;
bispentamethylcyclopentadienyltitanium dimethoxide;
bis(trimethylsilylcyclopentadienyl)titanium dimethoxide;
bis[1,3-di-(trimethylsilyl)cyclopentadienyl]titanium dimethoxide;
bis[1,2,4-tri(trimethylsilyl)cyclopentadienyl]titanium dimethoxide;
bisindenyltitanium dimethoxide;
bisfluorenyltitanium dimethoxide;
methylenebiscyclopentadienyltitanium dimethoxide;
ethylidenebiscyclopentadienyltitanium dimethoxide;
methylenebis(2,3,4,5-tetramethylcyclopentadienyl)titanium dimethoxide;
ethylidenebis(2,3,4,5-tetramethylcyclopentadienyl)titanium dimethoxide;
dimethylsilylbis(2,3,4,5-tetramethylcyclopentadienyl)titanium dimethoxide;
methylenebisindenyltitanium dimethoxide;
methylenebis(methylindenyl)titanium dimethoxide;
ethylidenebisindenyltitanium dimethoxide;
dimethylsilylbisindenyltitanium dimethoxide;
methylenebisfluorenyltitanium dimethoxide;
methylenebis(methylfluorenyl)titanium dimethoxide;
ethylidenebisfluorenyltitanium dimethoxide;
dimethylsilylbisfluorenyltitanium dimethoxide;
methylene(cyclopentadienyl)(indenyl)titanium dimethoxide;
ethylidene(cyclopentadienyl)(indenyl)titanium dimethoxide;
dimethylsilyl(cyclopentadienyl)(indenyl)titanium dimethoxide;
methylene(cyclopentadienyl)(fluorenyl)titanium dimethoxide;
ethylidene(cyclopentadienyl)(fluorenyl)titanium dimethoxide;
dimethylsilyl(cyclopentadienyl)(fluorenyl)titanium dimethoxide;
methylene(indenyl)(fluorenyl)titanium dimethoxide;
ethylidene(indenyl)(fluorenyl)titanium dimethoxide;
dimethylsilyl(indenyl)(fluorenyl)titanium dimethoxide, etc.

Examples of the zirconium compound include ethylidenebiscyclopentadienylzirconium dimethoxide, dimethylsilylbiscyclopentadienylzirconium dimethoxide, etc. Examples of the hafnium compounds include ethylidenebiscyclopentadienylhafnium dimethoxide, dimethylsilylbiscyclopentadienylhafnium dimethoxide, etc. Particularly desirable transition-metal compounds among them are titanium compounds.

In addition to the combinations of the above, the compound may be a bidentate coordination complex such as 2,2'-thiobis(4-methyl-6-tert-butylphenyl)-titanium diisopropoxide and 2,2'-thiobis(4-methyl-6-tertbutylphenyl)titanium dimethoxide.

On the other hand, the component (B) of the catalyst according to the present invention is a coordination complex compound comprising an anion in which a plurality of radicals are bonded to a metal; and a quaternary ammonium salt. There are available a variety of such coordination complex compounds. Examples of the anion in which a plurality of radicals are bonded to a metal and which is a constituent of the coordination complex compound include the anion represented by the general formula (VI)

$$(M^2X^1X^2\text{---}X^n)^{(n-m)-} \qquad (VI)$$

wherein $M^2$ is a metal selected from groups 5 to 15 of the Periodic Table; $X^1$ to $X^n$ are each a hydrogen atom, a dialkyl amino group, an alkoxy group, an aryloxy group, an alkyl group having 1 to 20 carbon atoms, an aryl group (inclusive of halogen-substituted aryl group), an alkylaryl group, an arylalkyl group, a substituted alkyl group, an organometalloid group or a halogen atom; m is the valency of $M^2$, indicating an integer of 1 to 7; an n is an integer of 2 to 8.

Specific examples of $M^2$ include B, Al, Si, P, As, Sb, etc. Specific examples of $X^1$ to $X^n$ include a dialkylamino group such as dimethylamino and diethylamino; an alkoxyl group such as methoxy, ethoxy and n-butoxy; an aryloxy group such as phenoxy, 2,6-dimethylphenoxy and naphthyloxy; an alkyl group having 1 to 20 carbon atoms such as methyl, ethyl, n-propyl, iso-propyl, n-butyl, n-octyl and 2-ethylhexyl; an aryl group having 6 to 20 carbon atoms, alkylaryl group or arylalkyl group such as phenyl, p-tolyl, benzyl, mono-to penta-(fluoro)phenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; a halogen atom such as F, Cl, Br and I; and an organometalloid group such as pentamethylantimony group, trimethylsilyl group, trimethylgermyl group, diphenylarsine group, dicyclohexylantimony group and diphenylboron group.

Specific examples of the above-mentioned anion include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $BF_4^-$, $PF_6^-$, $P(C_6F_5)_6^-$, $Al(C_6HF_4)_4^-$, etc.

There are a variety of examples of quaternary ammonium salts, which are exemplified by N-methylpyridinium; orthocyano-N-methyl-pyridinium; metacyano-N-methylpyridinium; metatrifluoromethyl-N-methylpyridium; N-benzylpyridinium; orthocyano-N-benzylpyridinium; metacyano-N-benzylpyridinium; paracyano-N-benzylpyridinium; metatrifluoromethyl-N-benzylpyridinium; 2,4-dinitro-N,N-diethyldiphenylammonium; trimethylphenylammonium, N-(4-nitrobenzyl)pyridinium, orthocyano-N-(4-nitrobenzyl)- pyridinium,paracyano-N-(4-nitrobenzyl)pyridinium, etc.

The component (B) of the catalyst according to the present invention is a coordination complex compound comprising in combination the above-mentioned quaternary ammonium salt and anion.

Among the aforestated coordination complex compounds are particularly favorable orthocyano-N-methylpyridinium tetra(pentafluorophenyl)borate; paracyano-N-methylpyridinium tetra(pentafluorophenyl)borate; paracyano-N-benzylpyridinium tetra(pentafluorophenyl)borate, etc.

In the catalyst according to the present invention is used, when necessary, an alkylating agent as component (C), which is exemplified from various compounds by the aluminum compound having an alkyl group represented by the general formula (VII)

$$R^{11}{}_p Al(OR^{12})_q X'{}_{3-p-q} \qquad (VII)$$

wherein $R^{11}$ and $R^{12}$ are each an alkyl group having 1 to 8, preferably 1 to 4 carbon atoms, $X'$ is a hydrogen atom or a halogen atom, p satisfies the relation $0 < p \leq 3$, desirably $p=2$ or 3, most desirably $p=3$, and q satisfies the relation $0 \leq q < 3$, desirably $q=0$ or 1; the magnesium compound having an alkyl group represented by the general formula (VIII)

$$R^{11}{}_2 Mg \qquad (VIII)$$

wherein $R^{11}$ is as previously defined; the zinc compound having an alkyl group represented by the general formula (IX)

$$R^{11}{}_2 Zn \qquad (IX)$$

wherein $R^{11}$ is as previously defined; and the like.

The above-mentioned compounds having an alkyl group are desirably aluminum compounds having an alkyl group, more desirably trialkylaluminum compounds and dialkylaluminum compounds. Examples of the compounds, that is, the components (C) include trialkylaluminum such as trimethylaluminum, triethylaluminum, tri-n-propylaluminum, triisopropylaluminum, tri-n-butyl-aluminum, triisobutylaluminum and tri-tert-butylaluminum; dialkylaluminum halide such as dimethylaluminum chloride, diethylaluminum chloride, di-n-propylaluminum chloride, diisopropylaluminum chloride, di-n-butylaluminum chloride, diisobutylaluminum chloride and di-tert-butylaluminum chloride; dialkylaluminum alkoxide such as dimethylaluminum methoxide and dimethylaluminum ethoxide; dialkylaluminum methoxide and dimethylaluminum ethoxide; dialkylaluminum hydride such as dimethylaluminum hydride, diethylaluminum hydride and diisobutylaluminum hydride of which is particularly desirable triisobutylaluminum; dialkylmagnesium such as dimethylmagnesium, diethylmagnesium, di-n-propylmagnesium and diisopropylmagnesium; and dialkylzinc such as dimethylzinc, diethylzinc, di-n-propylethylzinc and diisopropylzinc, and the like.

The catalyst according to the present invention comprises as the principal components the above-mentioned components (A) and (B), or the components (A), (B) and (C), and may be incorporated with a catalytic component in additon to the above components. The compounding ratios (A):(B) and (A):(B):(C) in the catalyst vary depending upon various conditions and can not be unequivocally defined. Under ordinary circumstances, however, the molar ratio of (A) to (B) is 1:10 to 10:1 and that of (A) to (C) is 1:0.01 to 1:1,000.

The catalyst according to the present invention as described hereinbefore exhibits a high activity in the production of a styrenic polymer having a high degree of syndiotactic configuration. Hence, the present invention further provides a process for producing a styrenic polymer having a high degree of syndiotactic configuration by the use of the above-described catalyst.

The production of a styrenic polymer according to the present invention is put into practice by polymerizing or copolymerizing styrenic monomer/s such as styrene and/or styrene derivative/s exemplified by an alkylstyrene, an alkoxystyrene, a halogenated styrene, a vinyl benzoate ester, etc. in the presence of the catalyst comprising as the principal components (A) and (B) and, when necessary, the component (C).

The catalyst according to the present invention is brought into contact with styrenic monomer/s by any one of the various methods including:

(1) a method in which the reaction product of the components (A) and (B) as the catalyst is brought into contact with monomer/s to be polymerized;

(2) a method in which the reaction product of the components (A) and (B) is incorporated with the component (C) to produce the catalyst, which is then brought into contact with monomer/s to be polymerized;

(3) a method in which the reaction product of the components (A) and (C) is incorporated with the component (B) to produce the catalyst, which is then brought into contact with monomer/s to be polymerized;

(4) a method in which each of the components (A), (B) and (C) is added to monomer/s to be polymerized one by one in any order.

The reaction product of the components (A) and (B) may be isolated and purified in advance.

The addition or contact of the above-mentioned components (A), (B) and (C) may be carried out at a temperature of 0° to 100° C. and, needless to say, at the polymerization temperature.

The polymerization of a styrenic monomer or monomers may be carried out by means of bulk polymerization or solution polymerization by the use of an aliphatic hydrocarbon solvent such as pentane, hexane or heptane, an alicyclic hydrocarbon solvent such as cyclohexane or an aromatic hydrocarbon solvent such as benzene, toluene or xylene. The polymerizaiton temperature is not specifically limited, but is usually in the range of 0° to 90° C., preferably 20° to 70° C.

The molecular weight of the styrenic polymer to be obtained can be effectively modified by means of polymerization reaction in the presence of hydrogen.

The styrenic polymer thus obtained possesses a high degree of syndiotactic configuration. Here, the styrenic polymer having a high degree of syndiotactic configuration means that its stereochemical structure is mainly of syndiotactic configuraiton, i.e. the stereostructure in which phenyl groups or substituted phenyl group as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having a high degree of syndiotactic configuration" as mentioned in the present invention means polystyrene, poly(alkylstyrene), poly(halogenated styrene), poly(alkoxystyrene), poly(vinylbenzoate), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) include poly(methylstyrene), poly(ethylstyrene), poly(isopropylstyrene), poly(tert-butylstyrene), etc., poly(halogenated styrene) include, poly(chlorostyrene), poly(bromostyrene), and poly(fluorostyrene), etc. The poly(alkoxystyrene) include, poly(methoxystyrene), poly(ethoxystyrene), etc.

The most desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

The styrenic polymer obtained according to the process of the present invention is that with a high degree of syndiotacticity usually having a weight-average molecular weight of 10,000 to 10,000,000, preferably 100,000 to 5,500,000 with a number-average molecular weight of 5,000 to 5,500,000, preferably 50,000 to 2,500,000. The resultant polymer contains usually not more than several hundreds ppm of residual catalyst, thus dispensing with deashing step thereof. However, the styrene polymer having an exceptionally high degree of syndiotacticity as well as an extremely high purity and minimized residual catalyst can be obtained by the steps of deashing treatment of the polymer thus obtained, as required, with a washing agent containing hydrochloric acid, etc.; additional washing; drying under reduced pressure; cleaning with a solvent such as methyl ethyl ketone for removing solubles therein; and treatment of the insolubles thus obtained by the use of chloroform, etc.

The styrene polymer with a high degree of syndiotacticity has a melting point of 160° to 310° C. and is surpassingly superior to the conventional styrenic polymer having an atactic configuration in terms of heat resistance.

In the following, the present invention will be described in more detail with reference to examples and comparative examples.

EXAMPLE 1

In a 20 mL vessel which had been dried and purged with nitrogen were placed 10 mL of styrene and 10 $\mu$mol of triisobutylaluminum. The mixture was heated to raise the temperature thereof up to 70° C., incorporated with 0.50 $\mu$mol of orthocyano-N-methylpyridinium tetra(pentafluorenyl)borate and, after one (1) minute, further incorporated with 0.50 $\mu$mol of pentamethylcyclopentadienyltrimethyltitanium to proceed with polymerization at 70° C. for 4 hours. After the completion of the reaction, the reaction product was dried to afford 1.75 g of a polymer. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 96% by weight (corresponding to syndiotacticity). As the result, SPS having an activity of 70 kg/g.Ti was obtained at a yield of 1.68 g with residual Ti of 14 ppm and residual Al of 160 ppm in the product SPS.

EXAMPLE 2

The procedure in Example 1 was repeated to produce 1.50 g of a polymer except that 0.50 $\mu$mol of pentamethylcyclopentadienyltribenzyltitanium was used as the titanium compound in place of pentamethylcyclopentadienyltrimethyltitanium. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 97% by weight. As the result, SPS having an activity of 61 kg/g.Ti was obtained at a yield of 1.46 g with residual Ti of 16 ppm and residual Al of 190 ppm in the product SPS.

EXAMPLE 3

The procedure in Example 1 was repeated to produce 2.18 g of a polymer except that 0.50 $\mu$mol of paracyano-N-methylpyridinium tetra(pentafluorenyl)borate was used as the coordination complex compound in place of orthocyano-N-methylpyridinium tetra(pentafluorenyl)borate. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 96% by weight. As the result, SPS having an activity of 87 kg/g.Ti was obtained at a yield of 2.09 g with residual Ti of 11 ppm and residual Al of 130 ppm in the product SPS.

EXAMPLE 4

The procedure in Example 1 was repeated to produce 2.14 g of a polymer except that 0.50 $\mu$mol of paracyano-N-benzylpyridinium tetra(pentafluorenyl)borate was used as the coordination complex compound in place of orthocyano-N-methylpyridinium tetra(pentafluorenyl)borate. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 96% by weight. As the result, SPS having an activity of 86 kg/g.Ti was obtained at a yield of 2.05 g with residual Ti of 11 ppm and residual Al of 130 ppm in the product SPS.

EXAMPLE 5

The procedure in Example 1 was repeated to produce 0.52 g of a polymer except that 0.50 $\mu$mol of phenyltrimethylammonium tetra(pentafluorenyl)borate was used as the coordination complex compound in place of orthocyano-N-methylpyridinium tetra(pentafluorenyl)borate. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 98% by weight. As the result, SPS having an activity of 21 kg/g.Ti was obtained at a yield of 0.51 g with residual Ti of 46 ppm and residual Al of 530 ppm in the product SPS.

EXAMPLE 6

The procedure in Example 1 was repeated to produce 0.63 g of a polymer except that 0.50 μmol of metatrifluoromethylphenyltrimethylammonium tetra(pentafluorophenyl)borate was used as the coordination complex compound in place of orthocyano-N-methylpyridinium tetra(pentafluorenyl)borate. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 98% by weight. As the result, SPS having an activity of 26 kg/g.Ti was obtained at a yield of 0.62 g with residual Ti of 39 ppm and residual Al of 440 ppm in the product SPS.

EXAMPLE 7

The procedure in Example 1 was repeated to produce 1.02 g of a polymer except that 0.50 μmol of pentamethylcyclopentadienyltitanium trimethoxide was used as the titanium compound in place of pentamethylcyclopentadienyltrimethyltitanium. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 95% by weight. As the result, SPS having an activity of 40 kg/g.Ti was obtained at a yield of 0.97 g with residual Ti of 25 ppm and residual Al of 278 ppm in the product SPS.

EXAMPLE 8

The procedure in Example 1 was repeated to produce 0.38 g of a polymer except that the use of triisobutylaluminum was omitted. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 95% by weight. As the result, SPS having an activity of 15 kg/g.Ti was obtained at a yield of 0.36 g with residual Ti of 67 ppm and residual Al of 0 ppm in the product SPS.

EXAMPLE 9

The procedure in Example 8 was repeated to produce 0.30 g of a polymer except that 0.50 μmol of pentamethylcyclopentadienyltirbenzyltitanium was used as the titanium compound in place of pentamethylcyclopentadienyltrimethyltitanium. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 97% by weight. As the result, SPS having an activity of 12 kg/g.Ti was obtained at a yield of 0.29 g with residual Ti of 83 ppm and residual Al of 0 ppm in the product SPS.

EXAMPLE 10

The procedure in Example 8 was repeated to produce 0.25 g of a polymer except that 0.50 μmol of paracyano-N-methylpyridinium tetra(pentafluorophenyl)borate was used as the coordination complex compound in place of orthocyano-N-methylpyridinium tetra(pentafluorenyl)borate. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 94% by weight. As the result, SPS having an activity of 10 kg/g.Ti was obtained at a yield of 0.24 g with residual Ti of 100 ppm and residual Al of 0 ppm in the product SPS.

EXAMPLE 11

The procedure in Example 8 was repeated to produce 0.28 g of a polymer except that 0.50 μmol of paracyano-N-benzylpyridinium tetra(pentafluorophenyl) was used as the coordination complex compound in place of orthocyano-N-methylpyridinium tetra(pentafluorenyl)borate. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 94% by weight. As the result, SPS having an activity of 11 kg/g Ti was obtained at a yield of 0.26 g with residual Ti of 91 ppm and residual Al of 0 ppm in the product SPS.

COMPARATIVE EXAMPLE 1

The procedure in Example 1 was repeated to produce 4.81 g of a polymer except that ferrocenium tetra(pentafluorophenyl)borate was used as the coordination complex compound in place of orthocyano-N-methylpyridinium tetra(pentafluorenyl)borate. The resultant polymer was cut into slices of 1 mm or less in thickness, which were subjected to Soxhlet extraction for 6 hours by the use of methyl ethyl ketone (MEK) as the solvent to produce MIP (MEK-insoluble portion). As the result, however, MIP was obtained at a recovery rate of only 42% by weight, producing a large amounts of atactic polystyrene as a by-product with residual amounts including 11 ppm Ti, 400 ppm Al and 13 ppm Fe. In addition, the polymer was colored yellow by the contamination with iron.

COMPARATIVE EXAMPLE 2

In a 20 mL vessel which had been dried and purged with nitrogen were placed 10 mL of styrene, 150 μmol of triisobutylaluminum and 150 mmol of methylaluminoxane. The mixture was heated to raise the temperature thereof up to 70° C. and incorporated wiht 0.5 μm of pentamethylcyclopentadienyltitanium trimethoxide to proceed with polymerization at 70° C. for 4 hours. After the completion of the reaction, the reaction product was dried to afford 6.81 g of a polymer. The resultant polymer was cut into slices of 1 mm or less in thickness, which were subjected to Soxhlet extraction for 6 hours by the use of methyl ethyl ketone (MEK) as the solvent to produce MIP (MEK-insoluble portion) at a recovery rate of 97% by weight. As the result, SPS having an activity of 275 kg/g.Ti was obtained at a yield of 6.60 g with residual Ti of 4 ppm and residual Al of 1,230 ppm in the product SPS.

INDUSTRIAL APPLICABILITY

The catalyst according to the present invention is inexpensive as compared with the conventional catalysts comprising an aluminoxane as the primary component, exerts a high activity for the production of a styrenic polymer having a high degree of syndiotactic configuration and furthermore can reduce all of the residual metallic amounts in the course of the polymer production process, thereby enabling the simplification of the production process. According to the process of the present invention, therefore, a syndiotactic styrenic polymer can be obtained at a reduced production cost with enhanced efficiency.

We claim:

1. A catalyst for producing a styrenic polymer having a high degree of syndiotactic configuration, which comprises (A) a Ti compound selected from the Ti compounds represented by the formula (I)

$$TiR^1{}_aR^2{}_bR^3{}_cR^4{}_{4-(a+b+c)} \quad (I);$$

formula (II)

$$TiR^1{}_dR^2{}_eR^3{}_{3-(d+e)} \quad (II);$$

formula (III)

$$TiRXYZ \quad (III);$$

formula (IV)

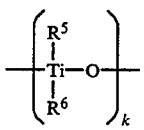

$$(IV)$$

and formula (V)

$$TiR^7R^8R^9R^{10} \quad (V),$$

wherein $R^1$, $R^2$, $R^3$ and $R^4$ are each a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group or a halogen atom; a, b and c are each an integer of 0 to 4; d and e each is a value from 0 to 3; R is a cyclopentadienyl group, a substituted cyclopentadienyl group, an indenyl group, a substituted indenyl group or a fluorenyl group; X, Y and Z, independently of one another, are each a hydrogen atom, an alkyl group having 1 to 12 carbon atoms, an alkoxy group having 1 to 12 carbon atoms, an aryl group having 6 to 12 carbon atoms, an aryloxy group having 6 to 20 carbon atoms, an arylalkyl group having 6 to 20 carbon atoms or a halogen atom; $R^5$ and $R^6$ each represent a halogen atom, an alkoxy group having 1 to 20 carbon atoms or an acyloxy group; k is an integer of 2 to 20; $R^7$ and $R^8$ are each a cyclopentadienyl group, substituted cyclopentadienyl group, indenyl group or fluorenyl group, and may be each crosslinked by a hydrocarbon radical having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms; $R^9$ and $R^{10}$ are each a hydrogen atom, halogen, hydrocarbon radical having 1 to 20 carbon atoms, alkoxy group having 1 to 20 carbon atoms, amino group or thioalkoxy group having 1 to 20 carbon atoms, and (B) a coordination complex compound comprising an anion in which a plurality of radicals are bonded to a metal and a quaternary ammonium salt, wherein the anion is represented by formula (VI)

$$(M^2X^1X^2\cdots X^n)^{(n-m)-} \quad (VI)$$

wherein $M^2$ is a metal selected from the groups 5 to 15 of the Periodic Table; $X^1$ to $X^n$ are each a hydrogen atom, a dialkyl amino group, an alkoxy group, an aryloxy group, an alkyl group having 1 to 20 carbon atoms, an aryl group, a halosubstituted aryl group, an alkylaryl group, an arylalkyl group, a substituted alkyl group, an organometalloid group or halogen atom; m is the valency of $M^2$, indicating an integer of 1 to 7, and n is an integer of 2 to 8.

2. A process for producing a styrenic polymer having a high degree of syndiotactic configuration by polymerizing at least one styrenic monomer selected from the group consisting of styrene and styrene compounds comprising:

polymerizing said styrenic monomer in the presence of the catalyst as set forth in claim 1 as the polymerization catalyst.

3. The process of claim 2, wherein said styrene compound is an alkylstyrene, an alkoxystyrene, a halogenated styrene or a vinylbenzoate.

4. A catalyst for producing a styrenic polymer having a high degree of syndiotactic configuration, which comprises (A) a Ti compound selected from the Ti compounds represented by formula (I)

$$TiR^1{}_aR^2{}_bR^3{}_cR^4{}_{4-(a+b+c)} \quad (I);$$

formula (II)

$$TiR^1{}_dR^2{}_eR^3{}_{3-(d+e)} \quad (II);$$

formula (III)

$$TiRXYZ \quad (III);$$

formula (IV)

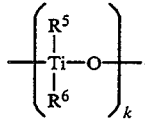

$$(IV)$$

and formula (V)

$$TiR^7R^8R^9R^{10} \quad (V)$$

wherein $R^1$, $R^2$, $R^3$ and $R^4$ are each a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group or a halogen atom; a, b and c are each a value of from 0 to 4; d and e are each a value of from 0 to 3; R is a cyclopentadienyl group, a substituted cyclopentadienyl group, an indenyl group, a substituted indenyl group or a fluorenyl group; X, Y and Z, independently of one another, are each a hydrogen atom, an alkyl group having 1 to 12 carbon atoms, an alkoxy group having 1 to 12 carbon atoms, an aryl group having 6 to 12 carbon atoms, an aryloxy group having 6 to 20 carbon group, an arylalkyl group having 6 to 20 carbon atoms or a halogen atom; $R^5$ and $R^6$ each represent a halogen atom, an alkoxy group having 1 to 20 carbon atoms or an acyloxy group; k is an integer of 2 to 20; $R_7$ and $R^8$ are each a cyclopentadienyl group, substituted cyclopentadienyl group, indenyl group or fluorenyl group, and may be each crosslinked by a hydrocarbon radical having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms; $R^9$ and $R^{10}$ are each a hydrogen atom, halogen, hydrocarbon radical having 1 to 20 carbon atoms, alkoxy group having 1 to 20 carbon atoms, amino group or thioalkoxy group having 1 to 20 carbon atoms, (B) a coordination complex compound comprising an anion in which a plurality of radicals are bonded to a metal and a quaternary ammonium salt, wherein the anion is represented by formula (VI)

(VI)

wherein $M^2$ is a metal selected from the groups 5 to 15 of the Periodic Table; $X^1$ to $X^n$ are each a hydrogen atom, a dialkyl amino group, an alkoxy group, an aryloxy group, an alkyl group having 1 to 20 carbon atoms, an aryl group, a halosubstituted aryl group, an alkylaryl group, an arylalkyl group, a substituted alkyl group, an organometalloid group or halogen atom; m is the valency of $M^2$, indicating an integer of 1 to 7, and n is an integer of 2 to 8 and (C) an alkylating agent.

5. A process for producing a styrenic polymer having a high degree of syndiotactic configuration by polymerizing at least one styrenic monomer selected from the group consisting of styrene and styrene compound comprising;

polymerizing said styrenic monomer in the presence of the catalyst as set forth in claim 4 as the polymerization catalyst.

6. The process of claim 5, wherein said styrene compound is an alkylstyrene, an alkoxystyrene, a halogenated styrene or a vinylbenzoate.

7. The catalyst according to claim 1, wherein the coordination complex compound as the component (B) comprises an anion in which a plurality of radicals are bonded to a metal and a quaternary pyridinium salt.

8. The catalyst according to claim 4, wherein the coordination complex compound as the component (B) comprises an anion in which a plurality of radicals are bonded to a metal and a quaternary pyridinium salt.

9. The catalyst according to claim 8, wherein the coordination complex compound as the component (B) is orthocyano-N-methylpyridinium tetra(pentafluorophenyl)borate, paracyano-N-methylpyridinium tetra(pentafluorophenyl)borate, or paracyano-N-benzylpyridinium tetra(pentafluorophenyl)borate.

* * * * *